(12) United States Patent
Sato et al.

(10) Patent No.: US 11,904,897 B2
(45) Date of Patent: Feb. 20, 2024

(54) SAFETY MANAGEMENT APPARATUS FOR AUTONOMOUS TRAVELING CART

(71) Applicant: Toyota Jidosha Kabushiki Kaisha, Toyota (JP)

(72) Inventors: Daisuke Sato, Susono (JP); Daisuke Ishii, Shizuoka-ken (JP); Hiroki Izu, Nagoya (JP); Hiroki Morita, Hiratsuka (JP); Kei Sato, Toyota (JP); Masaki Nanahara, Toyota (JP); Kazumi Serizawa, Toyota (JP); Hironobu Tanaka, Tokyo-to (JP); Shunsuke Mogi, Hachioji (JP); Takashi Hayashi, Nagoya (JP); Akihiro Kusumoto, Susono (JP); Tetsuya Kanata, Susono (JP); Yozo Iwami, Susono (JP); Yuhei Katsumata, Fuji (JP); Daisaku Honda, Nagoya (JP); Saki Narita, Toyota (JP); Hideki Fukudome, Toyota (JP); Takuya Watabe, Hachioji (JP); Naoko Ichikawa, Tokyo-to (JP); Yuta Maniwa, Susono (JP); Yuki Nishikawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 113 days.

(21) Appl. No.: 17/407,597

(22) Filed: Aug. 20, 2021

(65) Prior Publication Data
US 2022/0055661 A1    Feb. 24, 2022

(30) Foreign Application Priority Data
Aug. 24, 2020  (JP) ................... 2020-141190

(51) Int. Cl.
*B60W 60/00* (2020.01)
*B60R 25/23* (2013.01)
*G01G 19/44* (2006.01)

(52) U.S. Cl.
CPC ......... *B60W 60/0016* (2020.02); *B60R 25/23* (2013.01); *B60W 60/00253* (2020.02); *G01G 19/44* (2013.01); *B60W 2540/221* (2020.02)

(58) Field of Classification Search
CPC ........ B60W 60/0016; B60W 60/00253; B60R 25/23; G01G 19/44
See application file for complete search history.

(56) References Cited

U.S. PATENT DOCUMENTS

| | | | | |
|---|---|---|---|---|
| 4,285,529 | A | * | 8/1981 | Vaillancourt ........... B62B 17/06 280/24 |
| 2011/0259061 | A1 | * | 10/2011 | Brose ...................... E05B 81/42 70/237 |

(Continued)

FOREIGN PATENT DOCUMENTS

| | | |
|---|---|---|
| CN | 106627271 A | 5/2017 |
| JP | 2006-185331 A | 7/2006 |

*Primary Examiner* — James J Lee
*Assistant Examiner* — Jonathan E Reinert
(74) *Attorney, Agent, or Firm* — Dinsmore & Shohl LLP

(57) ABSTRACT

The safety management apparatus comprises a protective shield with automatic opening and closing, a sensor configured to obtain physical information related to an occupant boarded an autonomous traveling cart, and a controller configured to control the opening and closing of the protective shield. The protective shield is configured to be normally open and, when closed, shield an occupant space of the cart from the outside. The controller includes at least one memory including at least one program, and at least one processor coupled with the at least one memory. The at least one processor executes a first process and a second process upon execution of the at least one program. The first process (Continued)

is to determine whether the occupant is an infant based on the physical information. The second process, which is executed when the occupant is determined to be an infant, is to close the protective shield.

7 Claims, 7 Drawing Sheets

(56) References Cited

U.S. PATENT DOCUMENTS

| | | | |
|---|---|---|---|
| 2019/0001793 A1* | 1/2019 | Zeidan | B60J 1/2019 |
| 2019/0375409 A1* | 12/2019 | Hunt | G01C 21/36 |
| 2020/0070867 A1* | 3/2020 | Foster | B62B 9/142 |

* cited by examiner

SAFETY MANAGEMENT APPARATUS FOR AUTONOMOUS TRAVELING CART

CROSS-REFERENCE TO RELATED APPLICATION

The present application claims priority under 35 U.S.C. § 119 to Japanese Patent Application No. 2020-141190, filed Aug. 24, 2020, the contents of which are incorporated herein by reference in their entirety.

BACKGROUND

Field

The present disclosure relates to a safety management apparatus for an autonomous traveling cart.

Background Art

JP2006-185331A discloses a prior art relating to a loss of protection warning system that, when a protected person subject to be supervised by a guardian gets on an unknown vehicle, allows the guardian to immediately notice an abnormality in the protected person. The protected person in the prior art is specifically a young child. Ensuring the safety of vulnerable children is one of the important themes in a highly evolving transportation society.

SUMMARY

Incidentally, the applicant according to the present application is developing an autonomous traveling cart utilizing an autonomous traveling technique. Since all operation to a destination is performed automatically and the travel speed is low, the autonomous traveling cart can be utilized not only by an adult but also by a child. One of the uses of the autonomous traveling cart that is currently being investigated is the transportation of an infant. For example, the autonomous traveling cart can be used as a technique of delivering an infant from a kindergarten or a nursery school to a guardian. Alternatively, a guardian could send an infant to a destination by the autonomous traveling cart, and then the guardian would use another technique of transportation to reach the destination, where the guardian would finish her/his business and then receive the infant arriving later on the autonomous traveling cart.

The important thing here is how to ensure the safety of an infant during transportation on the autonomous traveling cart. However, the autonomous traveling cart that the applicant is developing is a highly versatile transportation system that does not limit the use. The autonomous traveling cart may be used to transport an infant or may be used for an adult to board. For example, it is assumed that a guardian with an infant will use the autonomous traveling cart. Therefore, the autonomous traveling cart is required not only to physically ensure safety when only an infant is on board, but also not to sacrifice easiness when an adult gets on and off there.

In view of the above problems, it is an object of the present disclosure to provide a safety management apparatus capable of physically securing safety when only an infant is on board without sacrificing easiness when an adult gets on and off the autonomous traveling cart.

To achieve the above object, a safety management apparatus for an autonomous traveling cart according to the present disclosure comprises a protective shield with automatic opening and closing, a sensor configured to obtain physical information related to an occupant boarded the autonomous traveling cart, and a controller configured to control the opening and closing of the protective shield. The protective shield is configured to be normally open and, when closed, shield an occupant space of the autonomous traveling cart from the outside. The controller includes at least one memory including at least one program, and at least one processor coupled with the at least one memory. The at least one processor executes a first process and a second process upon execution of the at least one program. The first process is to determine whether the occupant is an infant or not based on the physical information obtained by the sensor. The second process, which is executed when the occupant is determined to be an infant, is to close the protective shield.

According to the above configuration, when only an infant boards the autonomous traveling cart, the safety of the infant can be physically ensured because the protective shield is automatically closed and the occupant space is shielded from the outside. Also, the protective shield is normally open. Only after the occupant is determined to be an infant from the physical information obtained when the occupant boards there, the protective shield is closed. Therefore, the autonomous traveling cart, the easiness when an adult gets on and off is not sacrificed.

The protective shield may be configured not to be opened from the inside of the occupant space but to be opened from the outside of the occupant space. This configuration can prevent an infant from accidentally opening the protective shield.

The protective shield may be configured to, when opened, allow an adult to enter and exit the occupant space while standing, and when closed, narrow the occupant space to a size that the adult cannot board. This configuration can prevent the adult from forcibly entering a narrow space while keeping easiness when the adult gets on and off there.

The protective shield may have a portion formed of a material through which the inside of the occupant space can be seen from the outside when closed. This configuration can make surrounding people known that there is an infant there, and thereby can ensure the safety of the infant by observations by the surrounding people.

The at least one processor of the controller may further execute a third process and a fourth process upon execution of the at least one program. The third process is to obtain locational information of the guardian of the infant. The fourth process is to generate a traveling route of the autonomous traveling cart based on the obtained locational information of the guardian. This configuration can bring the infant automatically to the guardian.

The at least one processor of the controller may further execute a fifth process upon execution of the at least one program. The fifth process is to lock the protective shield in a closed state until the autonomous traveling cart arrives at the guardian. This configuration can prevent a third party from opening the protective shield and ensure the safety of the infant.

The at least one processor of the controller may further execute a sixth process, a seventh process, and an eighth process upon execution of the at least one program. The sixth process is to accept an entry of a passcode. The seventh process is to collate an entered passcode with a registered passcode of the guardian. Then, the eighth process, which is executed when the entered passcode is certificated, is to unlock the protective shield. This configuration can make it possible to reliably deliver the infant to the guardian.

As described above, according to the safety management apparatus for an autonomous traveling cart according to the present disclosure, it is possible to physically secure safety when only an infant is on board without sacrificing easiness when an adult gets on and off the autonomous traveling cart.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures and steps that are described in the embodiments shown as follows are not always indispensable to the disclosure unless specially explicitly shown otherwise, or unless the disclosure is explicitly designated by the structures or the steps theoretically.

1. Schematic Configuration of Autonomous Traveling Pallet

Figure 1:
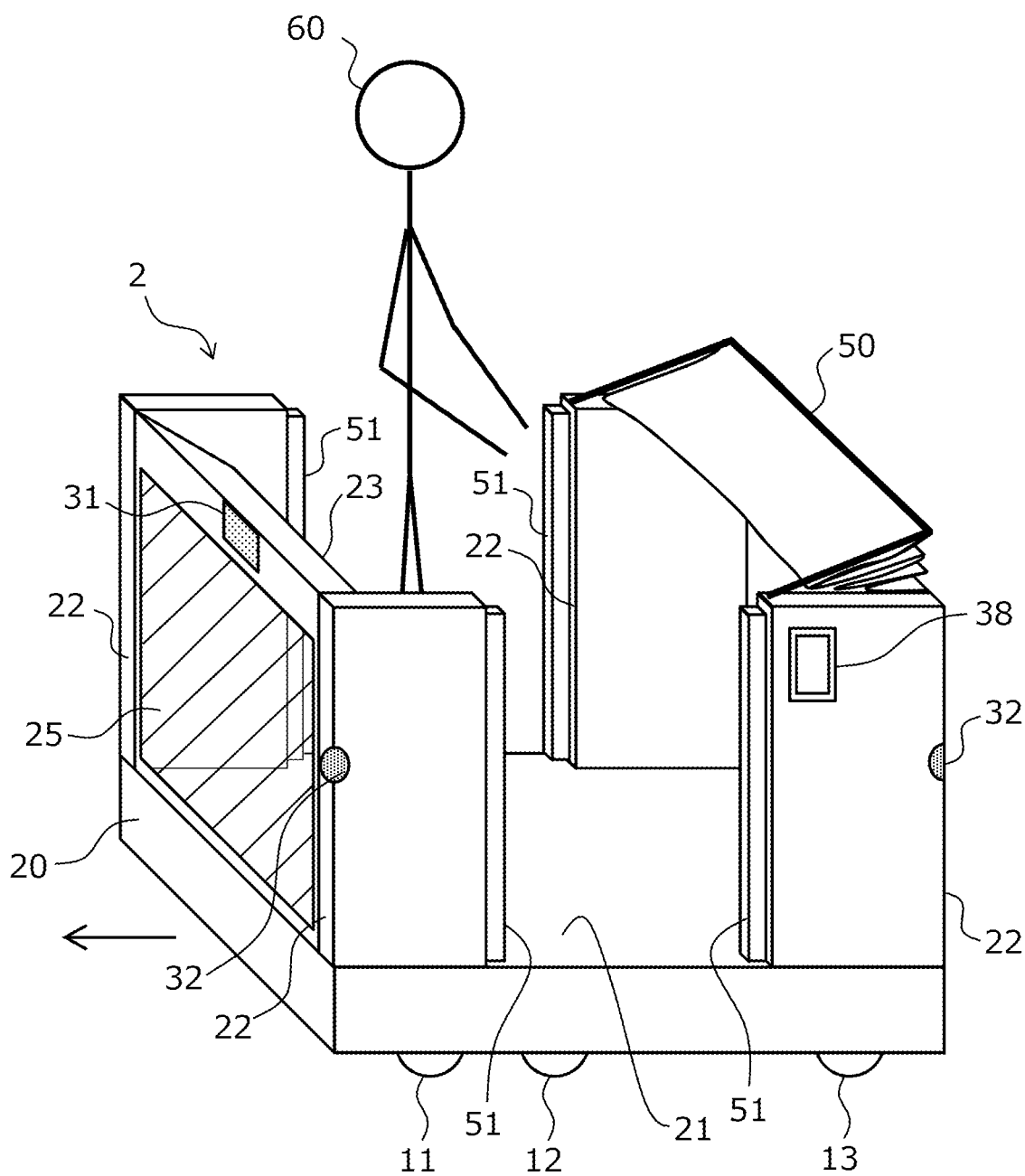
FIG. 1 shows a schematic configuration of an autonomous traveling cart to which a safety management apparatus according to an embodiment of the present disclosure is applied, and shows a state in which a protective shield is opened.

FIG. 1 shows a schematic configuration of an autonomous traveling pallet to which a safety management apparatus according to the present embodiment is applied. The autonomous traveling cart 2 according to the present embodiment is an autonomous traveling cart having a pallet-type body 20. Therefore, in the following description, the autonomous traveling cart 2 according to the present embodiment is referred to as an autonomous traveling pallet.

Figure 2:
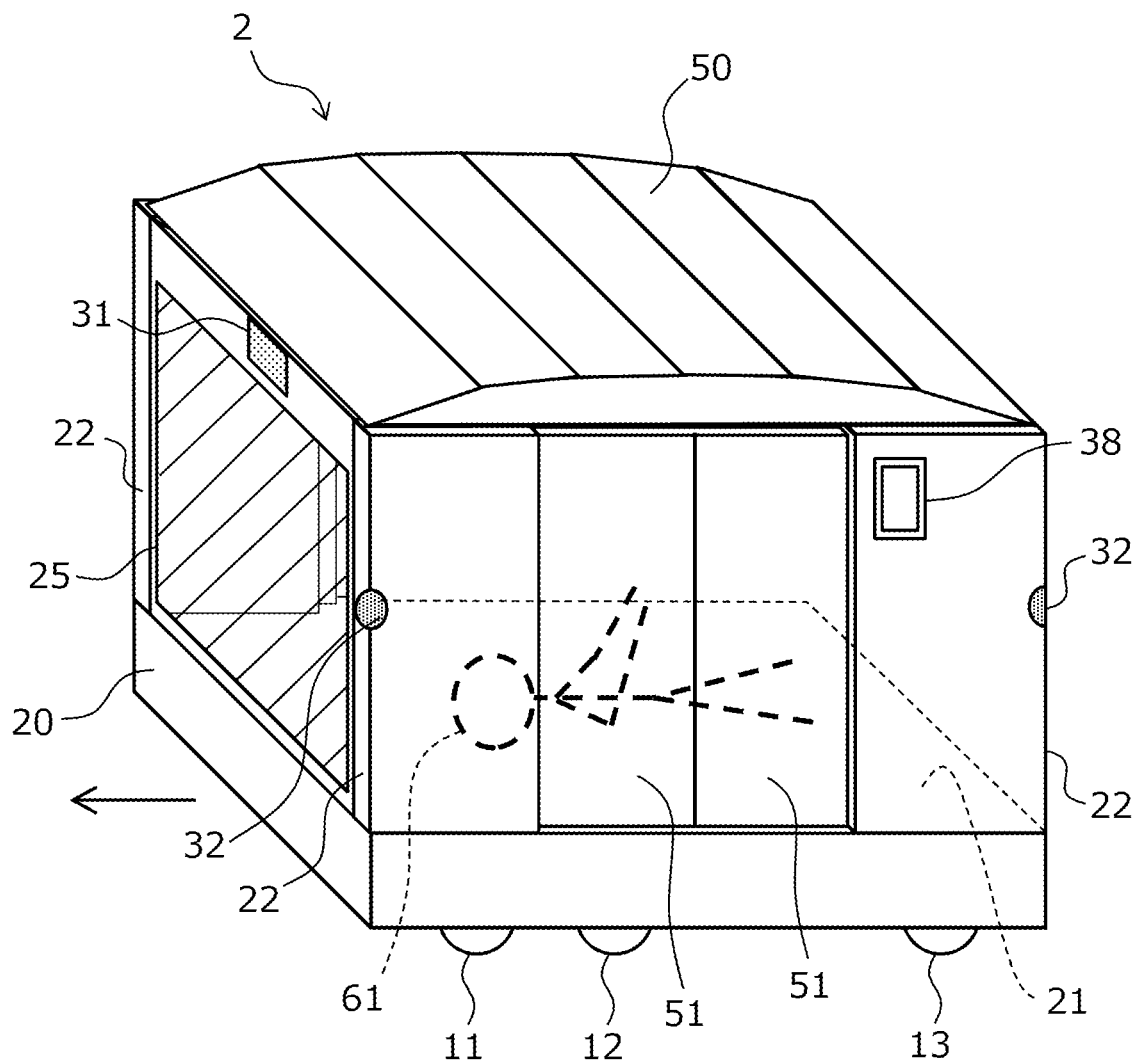
FIG. 2 shows a schematic configuration of the autonomous traveling cart to which the safety management apparatus according to the embodiment of the present disclosure is applied, and shows a state in which the protective shield is closed.

The autonomous traveling pallet 2 is a low-floor cart of which the body 20 has a deck 21 whose height is about 30 cm from the ground. The body 20 is equipped with front wheels 11, middle wheels 12, and rear wheels 13 on the left and right sides thereunder. These wheels 11, 12, 13 can travel the autonomous traveling pallet 2 in either the leftward or rightward direction in FIG. 2. Here, the leftward direction as indicated by the arrow in FIG. 2 is the basic traveling direction of the autonomous traveling pallet 2. Then, the traveling direction is defined as the forward direction of the autonomous traveling pallet 2 and the opposite direction is defined as the backward direction of the autonomous traveling pallet 2.

The deck 21 is equipped with a post 22 on each of left and right sides of front and rear sides. A beam 23 is bridged between the front left and right posts 22, 22. Similarly, although hidden in FIG. 1, another beam is bridged between the rear left and right posts 22, 22. The beams 23 can be used as seats by an occupant on the deck 21. Between the front left and right posts 22, 22, there is provided a window 25 fitted with material through which the inside of the occupant space can be seen from the outside, for example, transparent reinforced glass. Similarly, although hidden in FIG. 1, another window fitted with transparent reinforced glass is provided between the rear left and right posts 22, 22.

The autonomous traveling pallet 2 is provided with doors 51. The door 51 is a sliding type double-opening door. One side of the door 51 is housed in the front post 22, the other side of the door 51 is housed in the rear post 22. The doors 51 are provided on the left and right sides. The door 51 is an automatic door that is opened and closed by a motor (not shown). However, in the normal traveling mode, even while the autonomous traveling pallet 2 is traveling, the door 51 is maintained in an open state as shown in FIG. 1.

The autonomous traveling pallet 2 has a roof 50. The roof 50 is a foldable soft top roof. A material with weather resistance and blade resistance is used for the soft top. FIG. 1 shows a state in which the roof 50 is folded. The roof 50 is an automatic opening and closing roof that is opened and closed by a motor (not shown). However, in the normal traveling mode, the roof 50 is folded and housed over the rear beam. With the roof 50 and door 51 opened, it is possible for an adult 60 to get on and off while standing.

The autonomous traveling pallet 2 is equipped with external sensors for autonomous traveling. The first external sensor is a LIDAR 31. The LIDAR 31 is provided on each of the front upper portion and the rear upper portion of the autonomous traveling pallet 2 so as to sense the front and rear of the autonomous traveling pallet 2. The second external sensor is a camera 32. The camera 32 is provided in each post 22 so as to photograph the right front, left front, right rear, and left rear of the autonomous traveling pallet 2.

Also, a touch panel 38 as an HMI is mounted on one exterior of the post 22. Uses thereof will be described later.

FIG. 2 shows a schematic configuration of the autonomous traveling pallet 2 to which the safety management apparatus according to the present embodiment is applied, as in FIG. 1. However, while FIG. 1 shows a state in which the roof 50 and the door 51 are opened, FIG. 2 shows a state in which the roof 50 and the door 51 are closed. As shown in FIG. 2, by closing the door 51 and also closing the roof 50, the occupant space of the autonomous traveling pallet 2 is completely shielded from the outside. That is, the roof 50 and the door 51 function, when closed, as a protective shield to shield and protect the occupant space from the outside. The roof 50 and the door 51 are configured not to be opened from the inside of the occupant space but to be opened from the outside.

The roof 50 and the door 51 are closed when a special operation mode, specifically, an operation mode for transporting an infant 61 is selected. As used herein, an infant means a child, for example, from a baby to a kindergarten child, who has no or poor judgment about safety. With the roof 50 and the door 51 open, an adult 60 cannot get on because the occupant space is narrowed, but a sufficiently large occupant space is ensured for an infant 61. Then, the safety of the infant 61 who is on board alone is ensured physically by closing the roof 50 and the door 51.

However, even though the safety is physically ensured, a guardian is concerned about the state of the infant 61 inside. Taking this into account, the windows 25 fitted with transparent reinforced glass are provided. Even when the roof 50 and the door 51 are closed, the inside of the autonomous traveling pallet 2 can be observed through the windows 25. Also, because the autonomous traveling pallet 2 travels slowly, surrounding people can easily look at the inside through the windows 25. In other words, the windows 25 makes it possible to inform surrounding people that there is an infant 61 inside and to ensure the safety of the infant 61 by observation by the surrounding people.

The windows fitted with reinforced glass may also be provided on the doors 51 to allow observing the inside from the side face of the autonomous traveling pallet 2 as well. Further, transparent material may be used in a portion of the roof 50 in order to be able to observe the inside also from the top. The roof 50 may not necessarily be a soft top roof and may be a hard top roof as long as it can be folded and stored.

Although not illustrated, the autonomous traveling pallet 2 is equipped with a ventilation port so as to allow ventilation even when the roof 50 and the door 51 are closed. In addition, a small air conditioner is provided in the autonomous traveling pallet 2 to keep the inside of the occupant space at a moderate temperature even in summer and winter. Further, in order to prevent temperature rise caused by direct sunlight in summer, the roof 50 is made of material with heat shielding properties.

Figure 3:
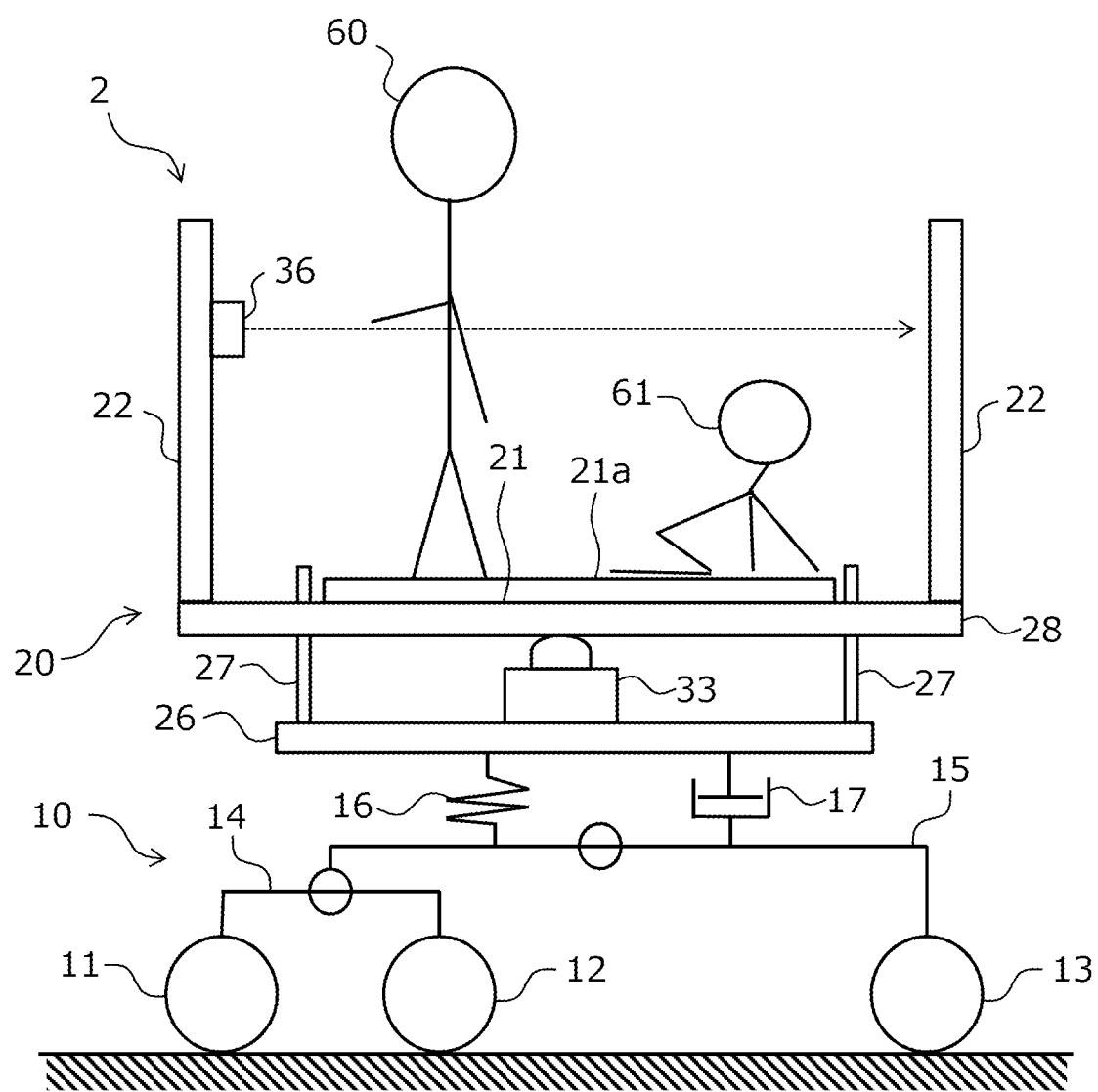
FIG. 3 shows a schematic configuration of a body and a chassis of the autonomous traveling cart to which the safety management apparatus according to the embodiment of the present disclosure is applied.

Next, a schematic configuration of the body 20 and the chassis 10 of the autonomous traveling pallet 2 will be described with reference to FIG. 3. The front wheels 11, middle wheels 12, and rear wheels 13 are mounted on the chassis 10. Each wheel 11, 12, 13 is driven by an independent motor (not shown) and can rotate at a speed and direction independent of each other. Specifically, the middle wheels 12 are normal wheels, but the front wheels 11 and the rear wheels 13 are omni wheels. Only the middle wheels 12, which are normal wheels, have the function of stopping the autonomous traveling pallet 2.

The chassis 10 consists of a bogie 14 and a rocker 15. The front wheels 11 and the middle wheels 12 are supported by the bogie 14. Specifically, motors for driving the front wheels 11, and motors for driving the middle wheels 12 are mounted on the bogie 14. The bogie 14 is swingably supported with respect to the rocker 15. Motors for driving the rear wheels 13 are mounted on the rocker 15. Further, although not shown, a small battery having a high volume energy density, such as a lithium ion battery is mounted on the rocker 15.

The body 20 is mounted on the top of the rocker 15 via a spring 16 and a damper 17. The body 20 has a top plate 26 which rests on the spring 16 and the damper 17, and an upper plate 28 which rests on the top of the top plate 26 via a load sensor 33. Guides 27 extending in the vertical direction are fixed on the top plate 26. The upper plate 28 is restricted from moving in the horizontal direction with respect to the top plate 26 by the guides 27. The upper surface of the upper plate 28 is the deck 21, and the posts 22 stand on the upper plate 28. In addition, the deck 21 is covered with a mat 21a.

The load sensor 33 is one of the sensors which obtain the physical information related to the occupant on the autonomous traveling pallet 2. The load sensor 33 is used to measure the weight of the occupant on the autonomous traveling pallet 2. An infrared sensor 36 is also provided as another sensor for obtaining the physical information related to the occupant on the autonomous traveling pallet 2. The infrared sensor 36 is mounted to the post 22 so as to emit light horizontally toward the inside of the occupant space. Specifically, the infrared sensor 36 is located at a height at which the infrared sensor 36 responds to an adult 60 and a child who is not an infant 61, for example, a child older than or equal to elementary school student, and does not respond to the infant 61.

2. Configuration of Control System of Autonomous Traveling Pallet

Figure 4:
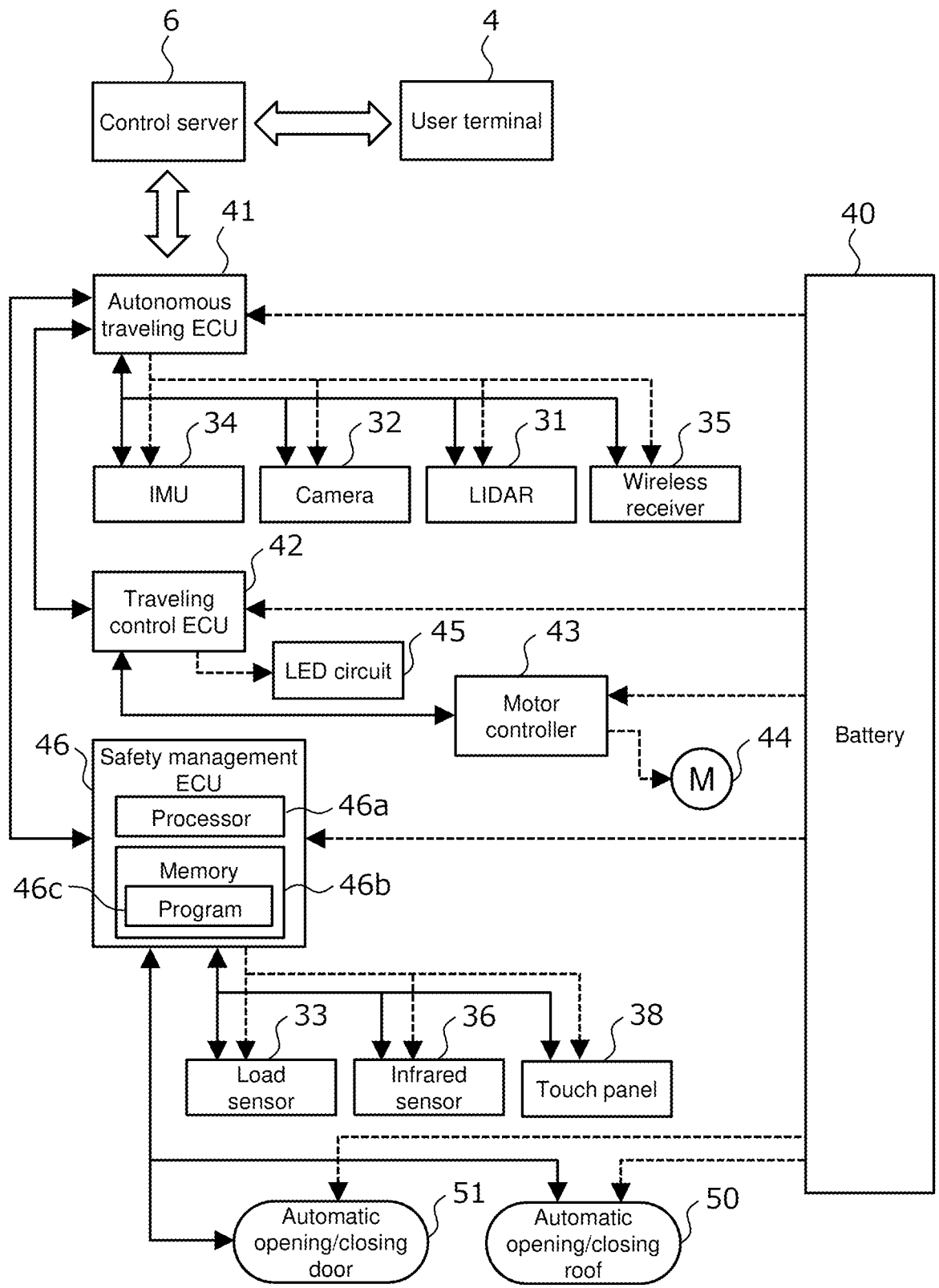
FIG. 4 shows a configuration of a control system of the autonomous traveling cart to which the safety management apparatus according to the embodiment of the present disclosure is applied.

Next, a configuration of a control system of the autonomous traveling pallet 2 to which the safety management apparatus according to the present embodiment is applied will be described with reference to FIG. 4. The autonomous traveling pallet 2 is equipped with three types of ECUs (Electronic Control Unit), i.e., an autonomous traveling ECU 41, a travel control ECU 42 and a safety management ECU 46.

The autonomous traveling ECU 41 is an ECU that controls autonomous traveling of the autonomous traveling pallet 2. The autonomous traveling ECU 41 has connections with the LIDAR 31 and the camera 32, and further connections with an IMU 34, and a wireless receiver 35. The LIDAR 31 is used for detection and ranging of an object existing around the autonomous traveling pallet 2. The camera 32 is used to recognize an object exiting around the autonomous traveling pallet 2. The IMU (Inertial Measurement Unit) 34 is used to measure angular velocity and acceleration of three axes. The wireless receiver 35 is used for vehicle-to-vehicle communication and road-to-vehicle communication utilizing 920 MHz band. The autonomous traveling ECU 41 is powered by a battery 40 mounted on the rocker 15. The autonomous traveling ECU 41 supplies power to the LIDAR 31, the camera 32, the IMU 34, and the wireless receiver 35.

Further, the autonomous traveling ECU 41 has a function of communicating with a control server 6 with mobile communication such as a 4G or a 5G. A user of the autonomous traveling pallet 2 communicates with the control server 6 using a user terminal 4 such as a smart phone or a tablet PC, and transmits a desired departure point and a desired destination to the control server 6. The control server 6 selects an appropriate autonomous traveling pallet 2 from among a plurality of available autonomous traveling pallets 2 and transmits the departure point and the destination to the selected autonomous traveling pallet 2. The autonomous traveling ECU 41 prepares a travel plan based on the departure point and the destination received from the control server 6.

The autonomous traveling ECU 41 inputs a target trajectory calculated from the travel plan into the travel control ECU 42. The travel control ECU 42 generates a motor command value for causing the autonomous traveling pallet 2 to travel along the target trajectory. Since the front wheels 11 and the rear wheels 13 are omni wheels, the traveling direction can be controlled along the target trajectory by controlling the difference in rotational speed between the left and right motors. The motor command value generated by the travel control ECU 42 is input to the motor controller 43.

Further, the motor controller 43 is supplied power directly from the battery 40. The motor controller 43 controls the power supply to the motors 44 of the left and right wheels 11, 12, and 13 according to the motor command value.

Incidentally, the autonomous traveling pallet 2 is provided with a lighting device (not shown). An LED is used as the lighting device. An LED circuit 45 for lighting the LED is supplied power from the travel control ECU 42. The travel control ECU 42 is powered by the battery 40. The LED circuit 45 may light the LED at all times, or may light the LED depending on ambient illuminance.

The safety management ECU 46 includes a memory 46b including at least one program 46c, and a processor 46a coupled to the memory 46b. The number of the memories 46b and the number of the processors 46a may be more than one. The processor 46a controls the door 51 and the roof 50, which are the protective shield, by executing the program 46c. That is, the safety management ECU 46 functions as a controller of the safety management apparatus according to the present embodiment. However, some functions as the controller of the safety management apparatus are carried out by the autonomous traveling ECU 41. The safety management ECU 46 has connections with the load sensor 33, the infrared sensor 36, and the touch panel 38. The safety management ECU 46 is powered by the battery 40. The load sensor 33, the infrared sensor 36, and the touch panel 38 are supplied power from the safety management ECU 46. On the other hand, the door 51 and the roof 50 are powered directly by the battery 40.

3. Operation of Safety Management Apparatus

The operation of the safety management apparatus according to the present embodiment will be described with reference to FIGS. 5 and 6.

Figure 5:
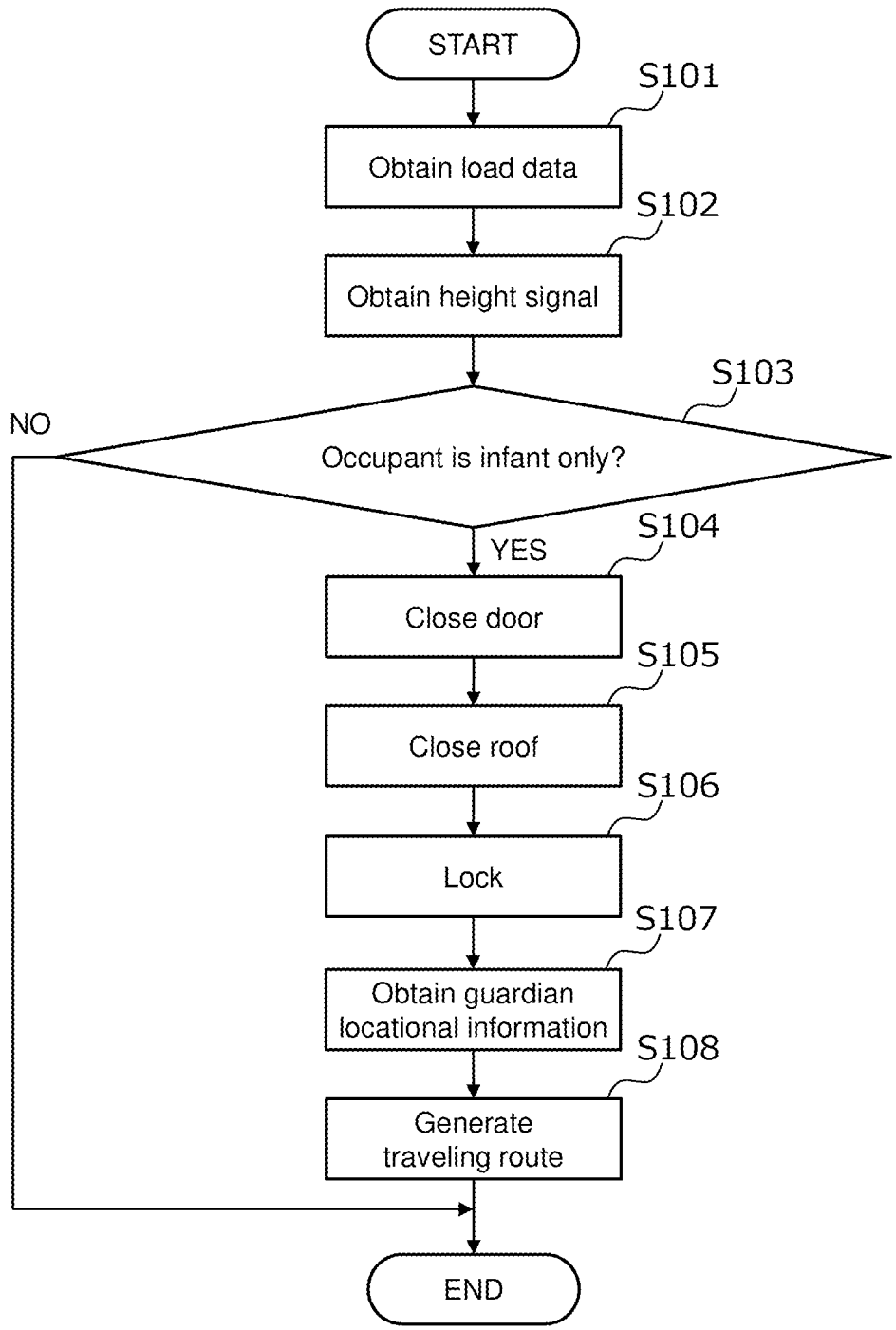
FIG. 5 shows a flowchart of processing executed at the time of boarding of an occupant in the safety management apparatus according to the embodiment of the present disclosure.

FIG. 5 shows a flowchart of processing executed at the time of boarding of an occupant in the safety management apparatus according to the present embodiment. When the autonomous traveling pallet 2 arrives at the user, the safety management ECU 46 starts obtaining load data from the load sensor 33. When the user is on board, the load measured by the load sensor 33 varies. For example, if a guardian gets on the deck 21 with an infant 61 and gets off the deck 21 leaving only the infant 61, the load will drop to the weight of the infant 61 after rising greatly once. Thus, the safety management ECU 46 monitors the load data obtained from the load sensor 33 and records it after its variation has settled (step S101).

The safety management ECU 46 also starts obtaining the height signal from the infrared sensor 36 at the same time as obtaining the load data. The height signal obtained from the infrared sensor 36 is either an on-signal output when the infrared the sensor 36 is reacting or an off-signal output when the infrared sensor 36 is not reacting. When the height of the occupant is higher than the height of the infrared sensor 36, the on-signal is obtained, and when the height of the occupant is lower than the height of the infrared sensor 36, the off-signal is obtained. The safety management ECU 46 monitors the height signal obtained from the infrared sensor 36 and records it after its variation has settled (step S102).

The safety management ECU 46 determines whether the occupant on the autonomous traveling pallet 2 is only an infant 61 or not by combining the load data and the height signal. Specifically, if the load is less than or equal to a threshold that is only considered to be an infant 61 and the height signal is the off-signal, the safety management ECU 46 determines that the occupant is only an infant 61. However, the threshold of the load is also set by considering the possibility that more than one infants 61 may be placed on the autonomous traveling pallet 2 (step S103). If the occupant is not only an infant 61, the subsequent steps are skipped and the autonomous travel control is executed by the autonomous traveling ECU 41 according to an normal operation mode.

When the occupant is only an infant 61, the operation mode of the autonomous traveling pallet 2 is switched from the normal operation mode to an infant transportation operation mode. In the infant transportation operation mode, the safety management ECU 46 closes the door 51 (step S104) and closes the roof 50 (step S105). Then, after the door 51 and the roof 50 are both fully closed, the safety management ECU 46 locks the door 51 and the roof 50 closed so that a third party cannot open them (step S106). As described above, since the door 51 and the roof 50 are normally open, and is closed after the occupant is determined to be an infant 61 from the physical information obtained when the occupant boards the autonomous traveling cart 2, there is no sacrifice of easiness when an adult gets on and off the autonomous traveling cart 2.

When the door 51 and the roof 50 are locked and ready for travel, the autonomous traveling ECU 41 starts the autonomous travel control in the infant transportation operation mode. In the infant transportation operation mode, the autonomous traveling ECU 41 obtains the location of the guardian of the infant 61 from the control server 6 (step S107). The location of the guardian is automatically obtained by the control server 6 using a GPS function of the user terminal 4 which the guardian possesses. The autonomous traveling ECU 41 generates a traveling route using the obtained location of the guardian as a destination (step S108). Incidentally, in the infant transportation operation mode, the autonomous traveling ECU 41 generates a traveling route with a logic that differs from that of the normal operation mode. For example, in a situation in which it is determined that there is a risk of sunstroke or heat stroke from illuminance or outside air temperature, the autonomous traveling ECU 41 generates a traveling route for traveling indoors, in the shade of buildings or trees, and so on.

Figure 6:
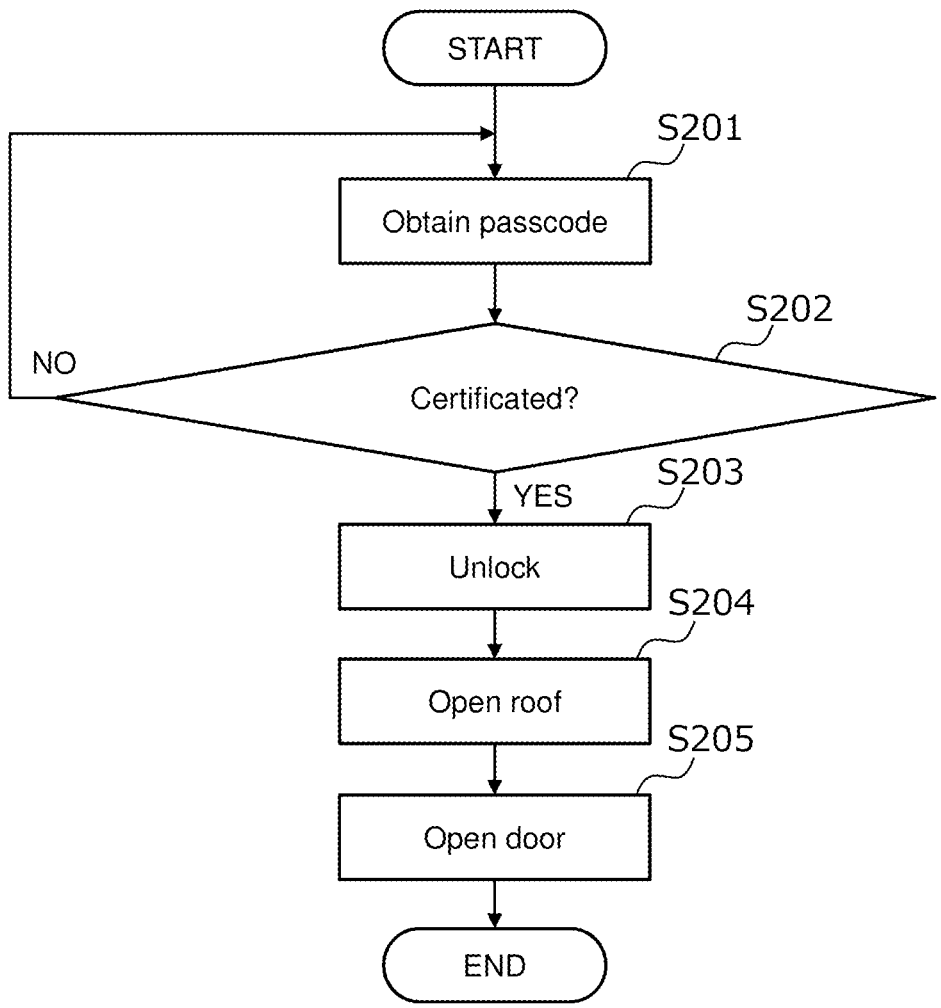
FIG. 6 shows a flowchart of processing executed when the autonomous traveling cart arrives at a destination in the safety management apparatus according to the embodiment of the present disclosure.

FIG. 6 shows a flowchart of processing executed when the autonomous traveling cart 2 arrives at a destination in the safety management apparatus according to the present embodiment. When the autonomous traveling pallet 2 arrives at the user, the safety management ECU 46 obtains a passcode entered into the touch panel 38 (step S201). The passcode is a code used to identify the guardian. When reserving the use of the autonomous traveling pallet 2 from the user terminal 4, the guardian registers the passcode in advance. The safety management ECU 46 communicates with the control server 6 and collates the passcode entered into the touch panel 38 with a registered passcode of the guardian. If the entered passcode does not match the registered passcode, the safety management ECU 46 prompts the user to enter a passcode into the touch panel 38 again, and if the entered passcode matches the registered passcode, the safety management ECU 46 certifies the entered passcode (step S202).

If the passcode is certified, the safety management ECU 46 unlocks the door 51 and the roof 50 (step S203), opens the roof 50 (step S204), and opens the door 51 (step S205). That is, the safety management ECU 46 does not unlock the door 51 and the roof 50, which are the protective shield, until the autonomous traveling cart 2 arrives at the destination and the passcode is certified. Thus, it is possible to reliably deliver the infant 61 to the guardian.

However, in order to ensure the safety of the infant 61, it may be necessary to authorize persons other than the guardian to unlock the door 51 and the roof 50. Therefore, if a passcode to prove a medical professional is entered, the safety management ECU 46 unlocks the door 51 and the roof 50. In addition, even a third party can unlock the door 51 and the roof 50 using an one-time passcode issued by the guardian if the third party obtains agreement with the guardian to use the one-time passcode.

4. Other Embodiments

Figure 7:
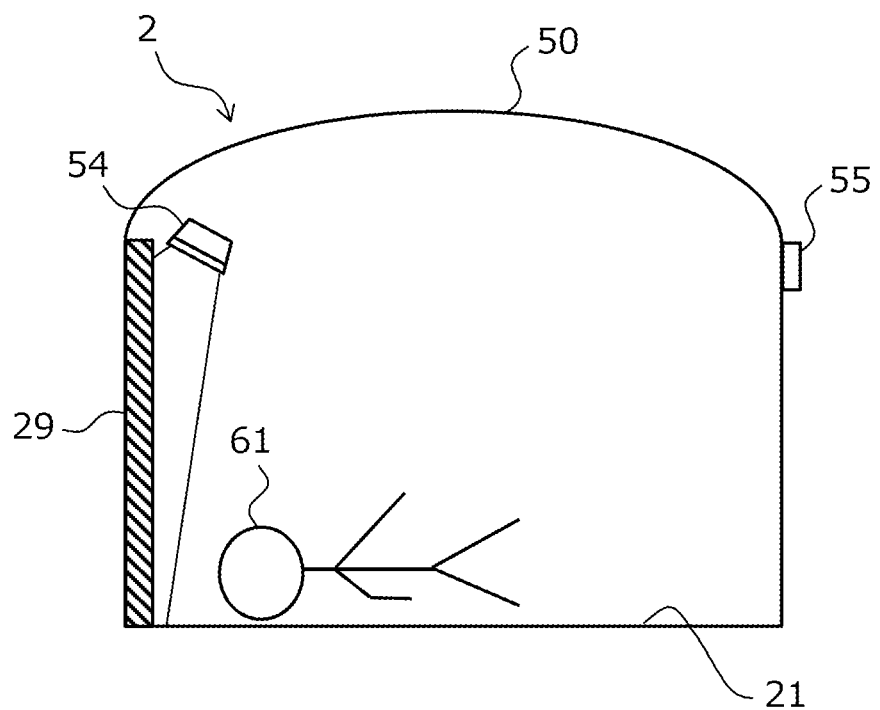
FIG. 7 is a diagram illustrating another embodiment of the present disclosure.

Finally, several other embodiments of the disclosure will be described. In an embodiment shown in FIG. 7, instead of the window 25 fitted with reinforced glass, a window 29 fitted with mirror glass is provided. The mirror glass is processed so that the inside can be seen from the outside, but the outside cannot be seen from the inside. This is to prevent the infant 61 from feeling anxious by looking at unknown people outside the window 29 during transportation by the autonomous traveling pallet 2. However, in order to function the mirror glass, the inside of the mirror glass must be brighter than the outside thereof. Therefore, in the occupant space, a light source 54 for emitting light to the entire mirror glass is installed. The light emitted from the light source 54 is automatically controlled according to the illuminance of the outside measured by an illumination sensor 55. Note that the light source 54 is adjusted in position and illumination angle so that strong light does not enter the eyes of the infant 61 directly in order to prevent strain on the eyes of the infant 61.

In yet another embodiment, a video display device for displaying an image is mounted on at least one side of the occupant space. Alternatively, an image projector is provided for projecting an image on at least one side of the occupant space. The infant 61 can be assured by showing the images of the guardian to the infant 61 by the video display device or the image projector. Further, if a loudspeaker and a microphone are provided in the occupant space so that a conversation can be made with the user terminal 4 of the guardian, the infant 61 can be more assured.

Incidentally, the above-described autonomous traveling pallet 2 can be utilized not only as a device for transporting an infant 61 but also as a device for transporting a pet such as a dog and a cat to the feeding owner. If the autonomous traveling pallet 2 is used for transporting the pet, a device for ejecting an air flow reproducing the smell of the feeding owner may be installed in the post 22. By giving the smell of the feeding owner to the pet, anxiety of the pet during transportation can be reduced.

What is claimed is:

1. A safety management apparatus for an autonomous traveling cart comprising:

a protective shield with autonomous opening and closing configured to be normally open and, when closed, shield an occupant space of the autonomous traveling cart from an outside, the protective shield including a roof;

a sensor configured to obtain physical information related to an occupant boarded the autonomous traveling cart; and a controller configured to control opening and closing of the protective shield, the controller comprising:
    at least one memory including at least one program; and
    at least one processor coupled with the at least one memory,
wherein the at least one processor executes upon execution of the at least one program:
    determining whether the occupant is an infant or not based on the physical information obtained by the sensor; and
    closing the protective shield when the occupant is determined to be the infant.

2. The safety management apparatus according to claim 1, wherein the protective shield is configured not to be opened from an inside of the occupant space but to be opened from the outside of the occupant space.

3. The safety management apparatus according to claim 1, wherein the protective shield is configured to, when opened, allow an adult to enter and exit the occupant space while standing, and when closed, narrow the occupant space to a size that the adult cannot board.

4. The safety management apparatus according to claim 1, wherein the protective shield has a portion formed of material through which an inside of the occupant space can be seen from the outside when closed.

5. The safety management apparatus according to claim 1, wherein the at least one processor further executes upon execution of the at least one program:
    obtaining locational information of a guardian of the infant; and
    generating a traveling route of the autonomous traveling cart based on obtained position information.

6. The safety management apparatus according to claim 5, wherein the at least one processor further executes upon execution of the at least one program locking the protective shield until the autonomous traveling cart arrives at the guardian.

7. The safety management apparatus according to claim 6, wherein the at least one processor further executes upon execution of the at least one program:
    receiving an entry of a passcode;
    matching an entered passcode with a registered passcode of the guardian; and
unlocking the protective shield in response to a certification of the entered passcode.

* * * * *